United States Patent
Ferrier et al.

(10) Patent No.: US 10,167,814 B2
(45) Date of Patent: Jan. 1, 2019

(54) TURBINE ENGINE NOZZLE HAVING CONFLUENT STREAMS AND INCLUDING A CORE COWL WITH OVERLAPPING FLAPS

(71) Applicant: SNECMA, Paris (FR)

(72) Inventors: Romain Ferrier, Roissy en Brie (FR); Alexandre Couilleaux, Morsang sur Orge (FR); Jackie Raymond Julien Prouteau, Villecresnes (FR); Nicolas Sirvin, Brunoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 448 days.

(21) Appl. No.: 15/023,952

(22) PCT Filed: Sep. 16, 2014

(86) PCT No.: PCT/FR2014/052301
§ 371 (c)(1),
(2) Date: Mar. 22, 2016

(87) PCT Pub. No.: WO2015/040323
PCT Pub. Date: Mar. 26, 2015

(65) Prior Publication Data
US 2016/0237949 A1    Aug. 18, 2016

(30) Foreign Application Priority Data

Sep. 23, 2013 (FR) ...................................... 13 59113

(51) Int. Cl.
*F02K 1/46* (2006.01)
*F02K 1/38* (2006.01)
*F02K 1/40* (2006.01)

(52) U.S. Cl.
CPC ................ *F02K 1/46* (2013.01); *F02K 1/386* (2013.01); *F02K 1/40* (2013.01); *F05D 2220/30* (2013.01);
(Continued)

(58) Field of Classification Search
CPC ... F02K 1/28; F02K 1/386; F02K 1/40; F02K 1/42; F02K 1/46; F02K 1/48; F02K 1/78; F02K 3/075
See application file for complete search history.

(56) References Cited

U.S. PATENT DOCUMENTS 3,550,721 A    12/1970    Bruner
4,279,382 A *  7/1981    Wilson, Jr. ................ F02K 1/40
                                                          239/11
(Continued)

FOREIGN PATENT DOCUMENTS

EP    1 870 588 A1    12/2007
EP    2 184 481 A2     5/2010
GB    2 372 780 A      9/2002

OTHER PUBLICATIONS

International Search Report dated Jan. 19, 2015, in PCT/FR2014/052301 Filed Sep. 16, 2014.

*Primary Examiner* — Todd E Manahan
*Assistant Examiner* — Rene Ford
(74) *Attorney, Agent, or Firm* — Oblon, McClelland, Maier & Neustadt, L.L.P.

(57) ABSTRACT

A turbine engine nozzle having confluent streams, the nozzle including a core cowl arranged around an annular central body and co-operating therewith to define a core annular channel for passing a flow of a core stream, the core stream on entry into the nozzle possessing an azimuth component driving residual gyratory movement of the core stream in two opposite gyratory flow directions corresponding to two operating speeds of the engine, the core cowl having an (Continued)

annular upstream portion that is extended downstream by an annular terminal portion having longitudinal cuts forming a plurality of flaps that overlap radially in pairs via their respective side edges in such a manner that, for each flap, one of the two side edges of the flap is positioned internally relative to the corresponding side edge of one of the adjacent flaps, while the other side edge of the flap is positioned externally relative to the corresponding side edge of the other adjacent flap.

12 Claims, 4 Drawing Sheets

(52) U.S. Cl.
CPC .... *F05D 2240/127* (2013.01); *F05D 2250/36* (2013.01)

(56) References Cited

U.S. PATENT DOCUMENTS

| | | | | |
|---|---|---|---|---|
| 4,577,462 | A * | 3/1986 | Robertson | F02K 1/386 181/220 |
| 6,314,721 | B1 * | 11/2001 | Mathews | F02K 1/46 181/213 |
| 6,606,854 | B1 * | 8/2003 | Siefker | B63G 13/02 181/213 |
| 2008/0105488 | A1 | 5/2008 | Dussillols et al. | |
| 2010/0146932 | A1 | 6/2010 | Webster | |
| 2013/0327047 | A1 | 12/2013 | Webster | |

* cited by examiner

TURBINE ENGINE NOZZLE HAVING CONFLUENT STREAMS AND INCLUDING A CORE COWL WITH OVERLAPPING FLAPS

BACKGROUND OF THE INVENTION

The present invention relates to the general field of nozzles with confluent streams fitted to turbine engines.

Typically, a turbine engine nozzle with confluent streams comprises an annular central body centered on a longitudinal axis of the engine, an annular core cowl positioned around the central body, being on the same axis, so as to co-operate therewith to define a core channel, and an annular bypass cowl positioned around the core cowl, being on the same axis, so as to co-operate therewith to define a bypass channel.

A gas stream (referred to as a core stream or hot stream) coming from the low pressure turbine of the engine flows in the core channel of the nozzle. Another gas stream (referred to as the bypass stream or the cold stream) outside the engine flows in the bypass channel. The core and bypass streams mix in a confluence zone situated at the exit from the core channel. Reference may be made to Document EP 1 870 588, which describes a mixer for such a nozzle.

A nozzle with confluent streams presents certain problems relating to questions of ventilation at different operating points of the engine. In particular, the nacelle of the engine is ventilated by a stream of air flowing in the bypass channel and that is sucked in by the core stream in the confluence zone by a jet pump effect. Unfortunately, one of the critical points of that system of suction by the jet pump effect is how it operates when the engine is idling. When idling, the jet of the core stream is reduced and is therefore not sufficiently energetic to ensure that the ventilation flow is driven correctly. Such poor suction can even lead to hot gas being ingested into the bypass channel, and that can lead to severe damage for equipment present in the nacelle compartment and indeed for the nacelle itself.

In order to avoid that phenomenon of re-ingesting hot gas, it is possible to improve the mixing between the core stream and the bypass stream. One known solution is to position geometrical elements that generate vortices in the primary channel in the proximity of the confluence zone. Such vortex generators serve to increase the amount of turbulence, thereby enhancing mixing between the streams. Nevertheless, in cruising flight, the vortex generators lead to significant head loss, with direct consequences on the overall efficiency of the engine.

Furthermore, those problems of re-ingesting hot gas while idling and of head loss while cruising are made worse by the residual gyration of the core stream on entry into the nozzle. Depending on the operating speed of the engine, the core stream entering into the nozzle possesses an azimuth speed component that is not zero. This residual gyratory motion is generally not in the same direction while the engine is operating at idling speed and while it is operating at cruising speed. Unfortunately, this azimuth component has the consequences both of increasing the probability of hot gas being re-ingested while idling, and of mismatching the vortex generators at cruising speed (thereby increasing head losses).

OBJECT AND SUMMARY OF THE INVENTION

A main object of the present invention is thus to mitigate such drawbacks by proposing to make use of the residual gyration of the core stream to act in passive manner to cause the nozzle to behave differently at different operating points of the engine.

In accordance with the invention, this object is achieved by a turbine engine nozzle having confluent streams, the nozzle comprising a core cowl arranged around an annular central body and co-operating therewith to define a core annular channel for passing a flow of a core stream, the core stream on entry into the nozzle possessing an azimuth component driving residual gyratory movement of the core stream in two opposite gyratory flow directions corresponding to two operating speeds of the engine, the core cowl having an annular upstream portion that is extended downstream by an annular terminal portion having longitudinal cuts forming a plurality of flaps that overlap radially in pairs via their respective side edges in such a manner that, for each flap, one of the two side edges of the flap is positioned internally relative to the corresponding side edge of one of the adjacent flaps, while the other side edge of the flap is positioned externally relative to the corresponding side edge of the other adjacent flap, two overlapping side edges defining between them a radial space forming a mixing zone that is suitable for being followed by the azimuth component of the core stream when it possesses a first gyratory flow direction and that is not suitable for being followed by the azimuth component of the core stream when it possesses a second gyratory flow direction opposite to the first gyratory flow direction. The core cowl of the nozzle of the invention serves to create mixing zones between the primary and bypass channels of the nozzle that correspond to the radial space lying between the side edges of the overlapping flaps. Depending on the direction of the residual gyration of the core stream in the nozzle, these mixing zones are seen or ignored by the flow of the core stream.

More precisely, when gyration is in the direction enabling the azimuth component of the core stream to follow these mixing zones, the core stream follows these zones and is subjected to an increase in its turbulence. The quality of mixing with the bypass stream is thus increased and the risk of hot gas being re-ingested into the bypass channel is eliminated. Conversely, when the gyration is in the opposite direction, the azimuth component of the core stream does not follow these mixing zones, and the only irregularities that the core stream encounters are then downward steps that lead to little head loss.

Preferably, for each flap, the side edge positioned internally relative to the corresponding side edge of the adjacent flap corresponds to the side edge situated upstream relative to the first gyratory flow direction of the core stream corresponding to an idling speed of the engine. As a result, by means of the core cowl of the nozzle of the invention, it is possible to reduce the risk of hot gas being ingested into the bypass channel while idling by improving mixing between the core and bypass streams in the nozzle and while minimizing the head losses that are induced when operating at cruising speed.

Also preferably, each flap is constituted by a plate portion possessing thickness that is substantially uniform.

More preferably, the flaps are made by cuts formed in a single plate forming the annular terminal portion (12a) of the core cowl.

Thus, fabrication of the core cowl is facilitated, since it requires only one single plate that is cut in order to form the flaps.

The side edge positioned on the outside of each flap may include geometrical means for disturbing the flow of the core stream. The presence of such geometrical means enables mixing between the core and secondary streams in the nozzle to be further improved while idling, but without that increasing head losses when operating at cruising speed.

The side edge positioned on the outside of each flap may thus include a winglet positioned at the downstream end of the side edge of the flap and extending radially inwards in order to disturb the flow of the core stream. Alternatively, the side edge positioned on the outside of each flap may include an undulation of the downstream end of the side edge of the flap in order to disturb the flow of the core stream. Such an undulation serves to increase the area of contact between the core and bypass streams in the nozzle so as to improve their mixing.

The nozzle may also include mechanical means for connecting together the side edge of overlapping flaps. Such means can be found to be necessary in order to mitigate the mechanical stresses to which the core cowl is subjected.

In particular, the nozzle may include solid plates or links connecting together the side edges of the overlapping flaps. The advantage of having recourse to links lies not only in stiffening the structure, but also in increasing the turbulence of the azimuth component of the core stream in the nozzle that flows along the mixing zone.

The nozzle may include eight flaps, with the two side edges of each of them being spaced apart angularly by 45°.

The invention also provides a turbine having such a nozzle with confluent streams.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1:
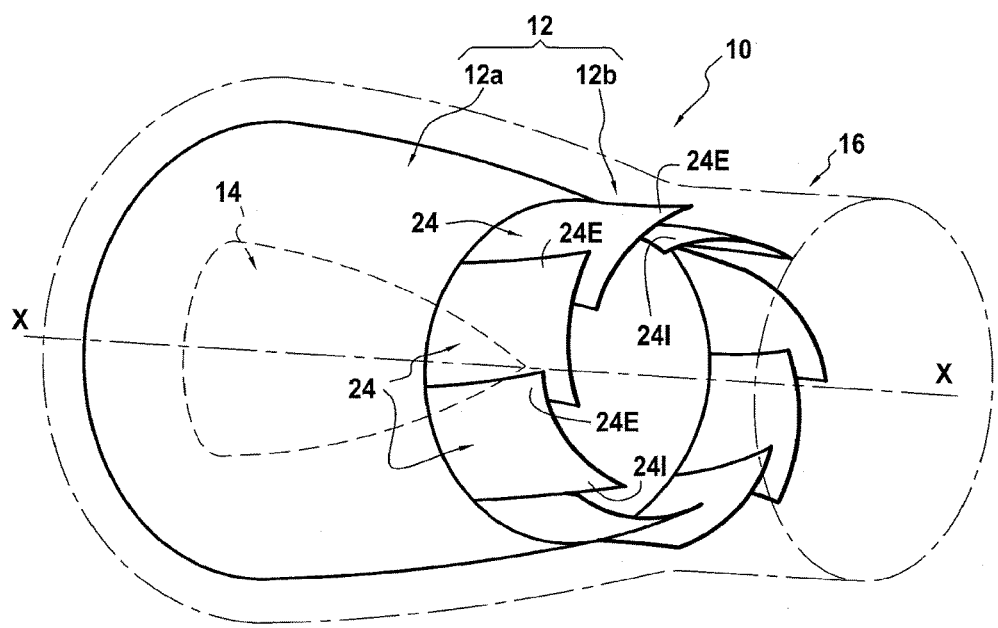
FIG. 1 is a diagrammatic view of a turbine engine nozzle of the invention having confluent streams.
Figure 2:
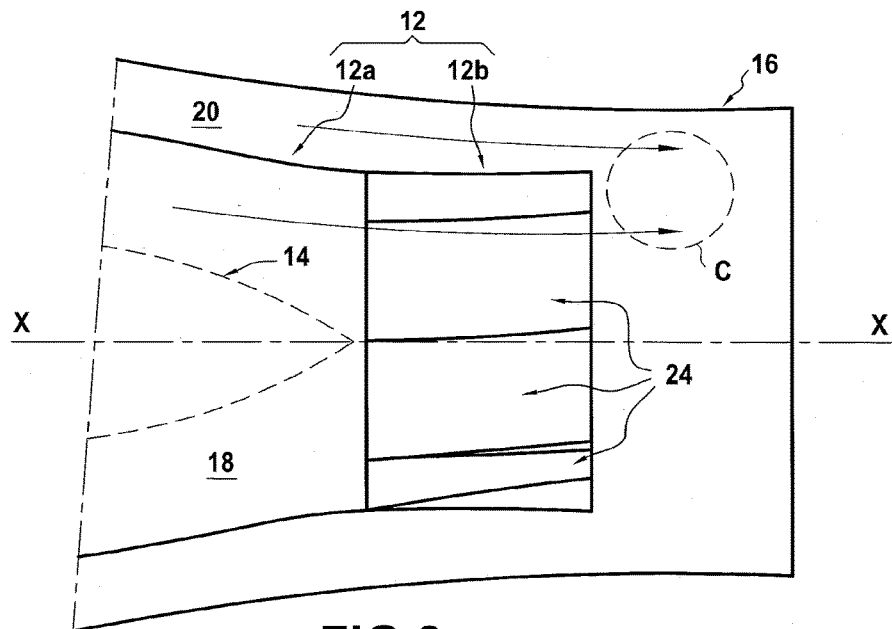
FIG. 2 is a longitudinal section view of the FIG. 1 nozzle.

FIGS. 1 and 2 are diagrams showing a turbine engine nozzle 10 of the invention having confluent streams and fitted with a core cowl 12.

More precisely, the nozzle 10 comprises an annular central body 14 centered on a longitudinal axis X-X of the engine, the annular core cowl 12 positioned around the central body on the same axis, and an annular bypass cowl 16 (formed in part by the nacelle of the engine) that is positioned around the primary cowl and on the same axis.

The central body 14 and the core cowl 12 define between them a core annular channel 18 in which a gas stream flows (referred to as the core stream or the hot stream) coming from the low pressure turbine of the engine. Likewise, the core cowl 12 and the bypass cowl 16 define between them a bypass annular channel 20 that is coaxial with the core channel 18 and in which there flows another gas stream (referred to as the bypass stream or the cold stream) outside the engine.

The core and bypass streams mix at the outlet from the core channel 18 in an annular confluence zone C shown diagrammatically in FIG. 2.

According to the invention, the core cowl 12 of such a nozzle has an annular upstream portion 12a that is extended downstream by a terminal portion 12b. The annular terminal portion 12b presents a plurality of longitudinal cuts that form a plurality of flaps 22 that overlap radially in pairs.

For this purpose, each flap 22 possesses two opposite side edges 24E and 24I that overlap at least in part with the corresponding side edges of the two flaps that are directly adjacent to the flap in question. This overlap is implemented more precisely in such a manner that one of the two side edges 24I of the flap in question is positioned radially internally relative to the corresponding side edge 24E of one of the flaps adjacent to the flap in question, whereas the other side edge 24E of the flap in question is positioned radially externally relative to the corresponding side edge 24I of the other flap adjacent to the flap in question. The overlap among the other flaps is implemented in the same manner, taking care that it is always the same side edge 24E of each flap that is external and the same side edge 24I that is internal.

It should be observed that in the example shown, the flaps 22 are eight in number and have their two side edges 24E, 24I that are spaced apart angularly by 45°. The set of these flaps together with their overlap thus forms a structure that is not axisymmetric.

Figure 3A:
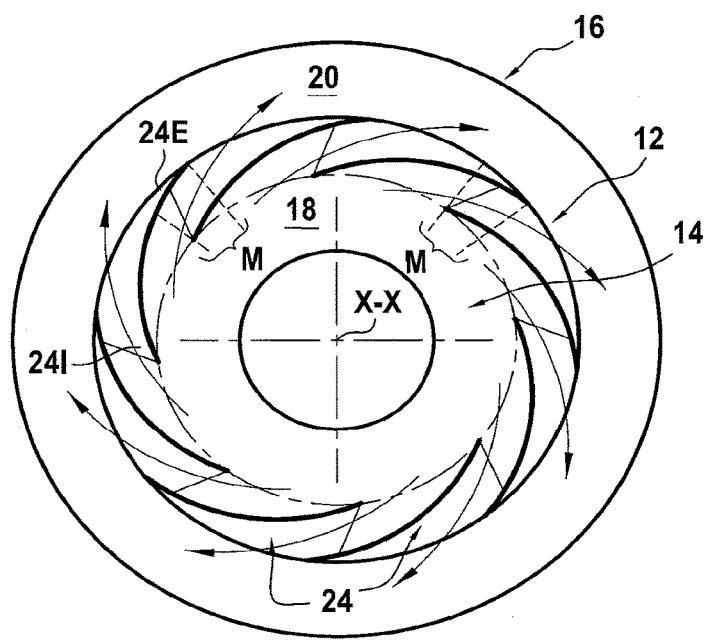
FIGS. 3A and 3B are end views of the FIG. 1 nozzle, showing respectively operation when idling and operation under cruising conditions.
Figure 3B:
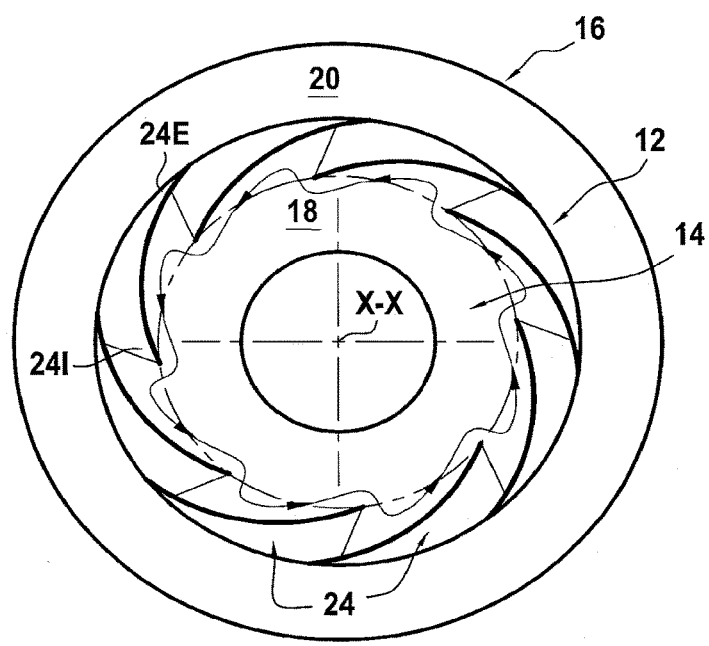

As a result, the radial space defined between the side edges 24E, 24I of the flaps that overlap forms a plurality of mixing zones M, shown diagrammatically in FIGS. 3A and 3B. These mixing zones M can be followed by the azimuth component of the core stream depending on the direction of rotation of its residual gyration. The overlap of each flap 22 of the core cowl is selected so that the side edge 24I that is positioned internally relative to the side edge 24E of the adjacent flap that is positioned externally corresponds to the side edge that is situated upstream relative to the gyratory flow direction of the core stream at the idling operating point of the engine.

When idling, the core stream from the low pressure turbine of the engine presents a gyratory component that is said to be "residual", and in a given direction (clockwise in this example). Generally, this direction of rotation reverses when the engine is operating at a cruising speed.

With such a configuration, when the engine is operating at idling speed, the azimuth component of the core stream flowing in the core channel 18 of the nozzle flows along the mixing zone M formed between the overlapping side edges of the various flaps 22 of the core cowl (see FIG. 3A). The azimuth component of the core stream follows these mixing zones M and the core stream is subjected to an increase in its turbulence. The quality of mixing with the bypass stream at the outlet from the core cowl is thus increased and any risk of hot gas being re-ingested in the bypass channel is eliminated.

When the engine is operating at cruising speed, the direction of the residual gyration of the core stream is reversed, i.e. it is counterclockwise. The azimuth component of the core stream no longer follows the mixing zones M. As shown in FIG. 3B, the only geometrical irregularities that the core stream encounters are downward steps formed by the overlap of the flaps 22 of the core cowl, with these steps producing little head loss.

Figure 4:
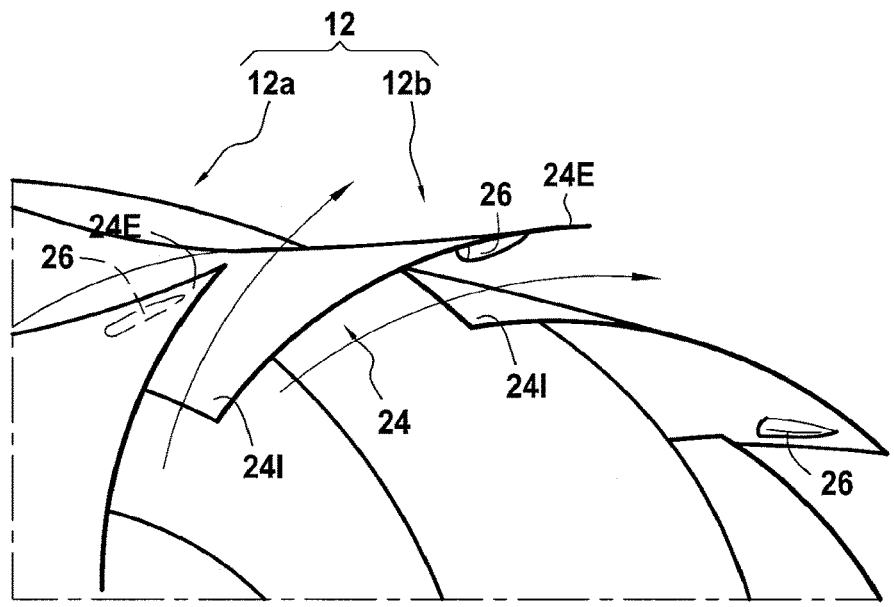
FIGS. 4 to 7 show particular arrangements of the core cowl of a nozzle of the invention.
Figure 5:
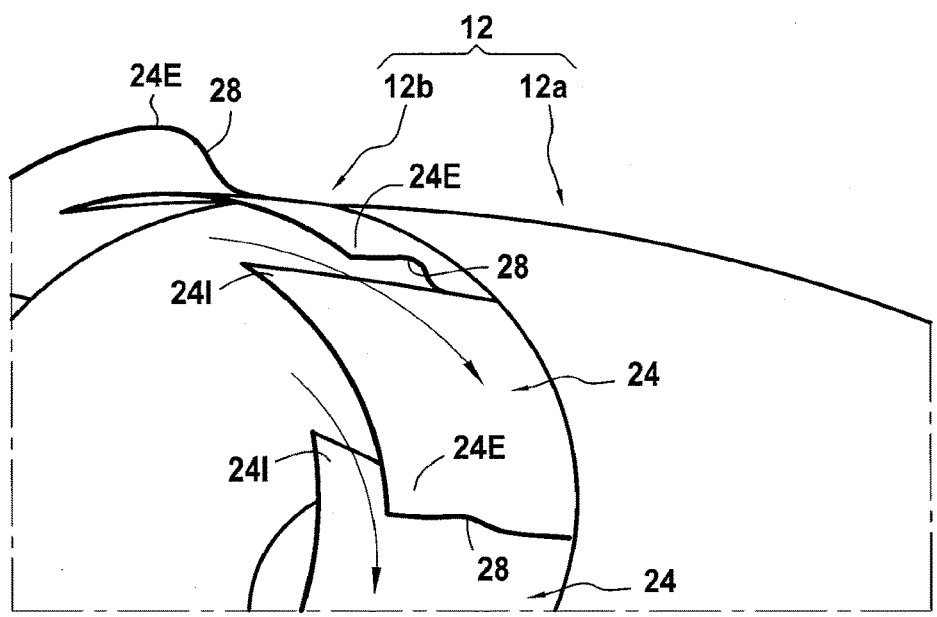

In an advantageous configuration shown in FIGS. 4 and 5, the core cowl 18 of the nozzle includes geometrical means at the externally positioned side edge 24E of each flap 22 for the purpose of disturbing the flow of the core stream when its azimuth component follows the mixing zones M defined between the overlapping side edges of the flaps.

Thus, in the example shown in FIG. 4, these means are in the form of winglets 26 positioned at the downstream end of the side edge 24E of each flap 22, these winglets 26 extending radially inwards to disturb the flow of the core stream. Such winglets thus make it possible to increase mixing at idling speed between the primary and bypass streams, but without increasing head loss when operating at cruising speed (the azimuth component of the core stream does not follow the mixing zones at that speed).

In the embodiment shown in FIG. 5, the improvement in the mixing between the streams at idling speed is obtained by the presence of undulations 28 formed in the downstream end of the side edge 24E of each flap 22. By undulating this side edge of the flaps, the area of contact between the bypass stream and the azimuth component of the core stream at idling speed following the mixing zones is increased, thereby improving mixing between these streams.

In another embodiment that is not shown, improved mixing is obtained between the streams at idling speed by adding a very rough coating in the mixing zones. This coating can thus be positioned on the inside surface of the side edge 24E or on the outside surface of the side edge 24I of each flap 22.

Figure 6:
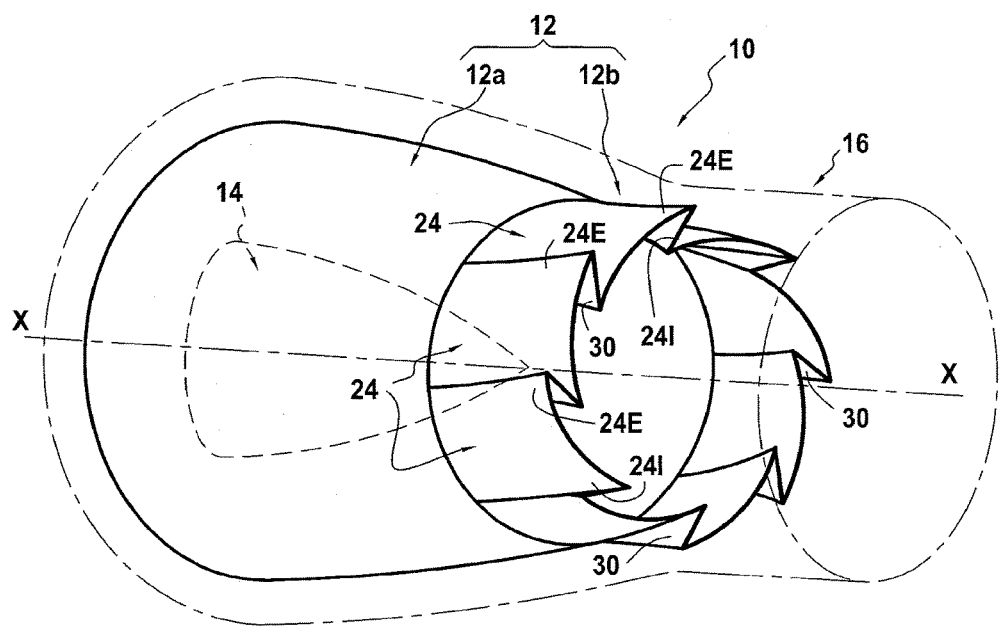
Figure 7:
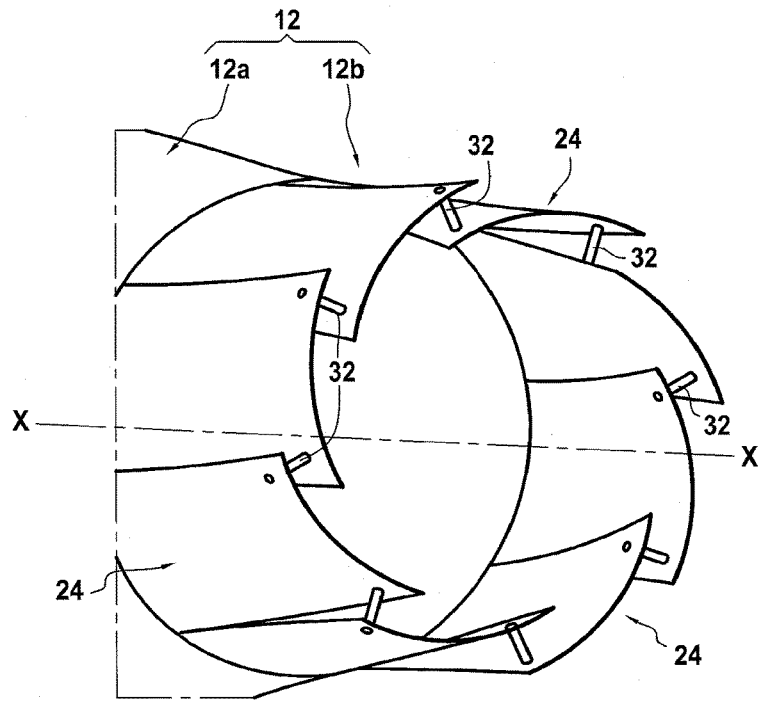

In another advantageous provision as shown in FIGS. 6 and 7, mechanical means are provided for connecting together the overlapping side edges of the flaps so as to mitigate the mechanical stresses to which the primary cowl might be subjected in operation.

In the example shown in FIG. 6, such means are solid plates 30 connecting together the side edges of overlapping flaps.

With such an arrangement, the azimuth component of the core stream at idling speed no longer crosses the mixing zones but follows them and is subjected to an increased level of turbulence therein. The area of contact between the core and bypass streams is thus limited (compared with the configuration without solid plates), but the presence of salient and acute connection angles between the flaps makes it possible to conserve protected surfaces that are followed by the azimuth component of the core stream only at idling speed.

In the embodiment shown in FIG. 7, links 32 are provided connecting together the side edges of the overlapping flaps. More precisely, these links 32 connect the inside surface of the side edge 24E of each flap to the outside surface of the side edge 24I of the flap situated facing it.

Such links 32 serve not only to stiffen the structure but also to increase turbulence in the azimuth component of the core stream of the nozzle flowing along the mixing zones M as defined between the overlapping flaps.

In general manner, it should be observed that the properties of the core cowl in the nozzle of the invention are influenced mainly by the outside diameter defined by the outer side edges 24E of the flaps, the inside diameter defined by the inner side edges 24I of the flaps, and the radial distance between the two side edges of a given flap.

The invention claimed is:

1. A turbine engine nozzle having confluent streams, the nozzle comprising:
a bypass cowl forming an outer boundary of an annular bypass channel;
a core cowl forming the inner boundary of the bypass channel and arranged around an annular central body and co-operating therewith to define a core annular channel for passing a flow of a core stream, the core stream on entry into the nozzle possessing an azimuth component driving residual gyratory movement of the core stream in two opposite gyratory flow directions corresponding to two operating speeds of an engine, the core cowl having an annular upstream portion that is extended downstream by an annular terminal portion having longitudinal cuts forming a plurality of fixed flaps that overlap radially in pairs via two respective side edges in such a manner that, for each flap, one of the two side edges of the flap is positioned internally relative to the corresponding side edge of one of the adjacent flaps, while the other side edge of the flap is positioned externally relative to the corresponding side edge of the other adjacent flap, two overlapping side edges defining between them a radial space forming a mixing zone that is suitable for being followed by the azimuth component of the core stream when it possesses a first gyratory flow direction and that is not suitable for being followed by the azimuth component of the core stream when it possesses a second gyratory flow direction opposite to the first gyratory flow direction.

2. A nozzle according to claim 1, wherein, for each flap, the side edge positioned internally relative to the corresponding side edge of the adjacent flap corresponds to the side edge situated upstream relative to the first gyratory flow direction of the core stream corresponding to an idling speed of the engine.

3. A nozzle according to claim 1, wherein each flap is constituted by a plate portion possessing thickness that is substantially uniform.

4. A nozzle according to claim 1, wherein the flaps are made by cuts formed in a single plate forming the annular terminal portion of the core cowl.

5. A nozzle according to claim 1, wherein the side edge positioned on the outside of each flap includes geometrical means for disturbing the flow of the core stream.

6. A nozzle according to claim 5, wherein the geometrical means includes a winglet positioned at the downstream end of the side edge of the flap and extending radially inwards in order to disturb the flow of the core stream.

7. A nozzle according to claim 5, wherein the geometrical means includes an undulation of the downstream end of the side edge of the flap in order to disturb the flow of the core stream.

8. A nozzle according to claim 1, further including mechanical means for connecting together the side edge of overlapping flaps.

9. A nozzle according to claim 8, wherein the mechanical means includes solid plates connecting together the side edges of overlapping flaps.

10. A nozzle according to claim 8, wherein the mechanical means includes links connecting together the side edges of overlapping flaps.

11. A nozzle according to claim 1, having eight of the flaps, with the two side edges of each of them being spaced apart angularly by 45°.

12. A turbine engine including a nozzle with confluent streams, the nozzle comprising:
a bypass cowl forming an outer boundary of an annular bypass channel;
a core cowl forming the inner boundary of the bypass channel and arranged around an annular central body and co-operating therewith to define a core annular channel for passing a flow of a core stream, the core stream on entry into the nozzle possessing an azimuth component driving residual gyratory movement of the core stream in two opposite gyratory flow directions corresponding to two operating speeds of the engine, the core cowl having an annular upstream portion that is extended downstream by an annular terminal portion having longitudinal cuts forming a plurality of fixed flaps that overlap radially in pairs via two respective side edges in such a manner that, for each flap, one of the two side edges of the flap is positioned internally relative to the corresponding side edge of one of the adjacent flaps, while the other side edge of the flap is positioned externally relative to the corresponding side edge of the other adjacent flap, two overlapping side edges defining between them a radial space forming a mixing zone that is suitable for being followed by the azimuth component of the core stream when it possesses a first gyratory flow direction and that is not suitable for being followed by the azimuth component of the core stream when it possesses a second gyratory flow direction opposite to the first gyratory flow direction.

\* \* \* \* \*

UNITED STATES PATENT AND TRADEMARK OFFICE
CERTIFICATE OF CORRECTION

PATENT NO. : 10,167,814 B2  
APPLICATION NO. : 15/023952  
DATED : January 1, 2019  
INVENTOR(S) : Romain Ferrier et al.

It is certified that error appears in the above-identified patent and that said Letters Patent is hereby corrected as shown below:

On the Title Page

Item (71) should read:  
-- (71) Applicant: SAFRAN AIRCRAFT ENGINES, Paris (FR) --

Signed and Sealed this  
Tenth Day of December, 2019

Andrei Iancu  
*Director of the United States Patent and Trademark Office*